United States Patent
Earle et al.

(10) Patent No.: US 7,195,432 B2
(45) Date of Patent: Mar. 27, 2007

(54) ADJUSTABLE CARGO GATE SYSTEM

(76) Inventors: Stephen Earle, 390 Hidden Pine Cir., Casselberry, FL (US) 32707; Floyd Jacobs, 690 Lake Kathryn Cir., Casselberry, FL (US) 32707

(*) Notice: Subject to any disclaimer, the term of this patent is extended or adjusted under 35 U.S.C. 154(b) by 135 days.

(21) Appl. No.: 11/175,522

(22) Filed: Jul. 6, 2005

(65) Prior Publication Data

US 2006/0239790 A1 Oct. 26, 2006

Related U.S. Application Data

(60) Provisional application No. 60/673,587, filed on Apr. 21, 2005.

(51) Int. Cl.
*B60P 7/08* (2006.01)

(52) U.S. Cl. ............... 410/94; 410/121; 410/130; 296/26.09

(58) Field of Classification Search ............... None
See application file for complete search history.

(56) References Cited

U.S. PATENT DOCUMENTS

| | | | |
|---|---|---|---|
| 5,700,047 A | 12/1997 | Leitner et al. | |
| 6,113,173 A | 9/2000 | Leitner et al. | |
| 6,283,525 B1 | 9/2001 | Morse | |
| 6,322,125 B2 | 11/2001 | Bauer | |
| 6,402,215 B1 | 6/2002 | Leitner et al. | |
| 6,513,850 B1 | 2/2003 | Reed | |
| 6,524,043 B2* | 2/2003 | Earle et al. ............ | 410/130 |
| 6,540,123 B1 | 4/2003 | Kmita et al. | |
| 6,719,345 B2 | 4/2004 | Ootsuka et al. | |
| 6,764,121 B1 | 7/2004 | Bauer | |
| 6,971,828 B2* | 12/2005 | Bernardo ............... | 410/135 |

* cited by examiner

*Primary Examiner*—Stephen Gordon
(74) *Attorney, Agent, or Firm*—Elsie C. Turner

(57) ABSTRACT

An adjustable cargo gate system for a flat bed of a truck or trailer comprising a grate of adjustable length having a center section and end sections which telescope into or out of the center section, and vertical and horizontal braces to hold the gate upright attached to cars that engage with and slide on tracks attached to the truck bed, is modified with the improvements hereinafter described. Track extensions onto the tailgate of the truck allow the gate system to be disposed at the rearmost end of the tailgate when opened flat. One-piece car brace members in the shape of right triangles replace the separate vertical and horizontal brace members and the separate sliding car members of the original system. Curved end sections are provided to enclose the sides of the opened tailgate. A bed-liner with integral tracks make installation of the system much simpler.

4 Claims, 5 Drawing Sheets

ADJUSTABLE CARGO GATE SYSTEM

This formal utility application claims the benefit of Provisional Application No. 60/673,587, filed on Apr. 21, 2005.

FIELD OF THE INVENTION

This invention relates to an improved apparatus for securing cargo on the bed of a truck or trailer, which can alternatively serve as a bed extender for a truck or trailer having a tailgate that opens to a horizontal position.

BACKGROUND OF THE INVENTION

Pickup trucks are in widespread use for carrying loads of varying size. When the load is small, it is wise to have it secured in some way so that it does not shift and slam into a side or end of the truck when it rounds a tight curve, accelerates or comes to an abrupt stop. U.S. Pat. No. 6,523,043 to the Applicants herein for an adjustable cargo gate system addressed that need, permitting a load to be secured at any place along the bed of the truck. For a load that is longer than the truck bed, it is desirable to extend the truck bed by lowering the tailgate and providing means to prevent the load from falling out of the back of the truck. In the prior art, there are a number of patents that have provided enclosures for the lowered tailgate to prevent a load from falling off the back of the truck. U.S. Pat. Nos. 5,700,047 and 6,113,173 to Leitner et al. provide such an enclosure. It has only two operating positions: over the tailgate beyond the rear end of the truck bed, and 180° from that position spaced forward from the rear end of the bed and the tailgate because the ends of the enclosure are pivotably fixed to the sides of the truck, limited the structure to rotate through 180°. Other pivoting tailgate enclosures are provided by U.S. Pat. No. 6,283,525 to Morse, U.S. Pat. No. 6,719,345 to Ootsuka et al. and U.S. Pat. No. 6,540,123 to Kmita et al. Like Leitner, Morse has only two operating positions, whereas Kmita has only one. Ootsuka teaches that the enclosure can be rotated to a 90° configuration or a 180° position. U.S. Pat. No. 6,322,125 to Bauer is for an enclosure convertible to a ramp. None of these inventions has the versatility of being secured anywhere along the bed of the truck or the tailgate.

Accordingly it is an object of this invention to provide an improved version of the adjustable cargo gate system of U.S Pat. No. 6,524,043 having alternative end sections to the cargo gate which can enclose an opened tailgate, thereby extending the truck bed, and which can be easily removed and stored in the corners of the truck bed, to improve and simplify the sliding braces which support the cargo gate in an upright position, and to provide a simpler form of the tracks on which the cargo gate is positioned.

SUMMARY OF THE INVENTION

A primary object of this invention is to improve on the Applicants' adjustable cargo gate system for a flat bed of a truck or trailer which is designed to restrain objects, including small items, from sliding or moving about when the vehicle accelerates, decelerates, or makes sharp turns. The original cargo gate system includes a pair of parallel tracks running along the truck bed from front to rear. Cars to which horizontal and diagonal braces are attachable slide in the tracks, and the braces support a grate or latticework of adjustable width by reason of end rails telescoping into rails of the center section. The improvements include the simplification of the bracing and sliding car means that hold the gate upright and allow it to be positioned perpendicularly to the truck bed and truck sides anywhere between the forward and rearward ends of the truck bed. Replacing separate diagonal and horizontal braces attachable to a separate car that slides on parallel tracks is a one-piece vertical right triangular member that is slidably engaged in a track on the truck bed, its vertical and horizontal legs serving to brace the latticework of the cargo gate. Another improvement is the extension of track to the inner surface of the truck tailgate to permit the system to slide onto the tailgate when opened to a horizontal position. Alternative curved end sections fit into the center latticework section, the curved ends providing enclosure of the sides of the opened tailgate. Lastly, instead of separate track members to be fastened at numerous intervals to the truck bed, a bed liner is provided which incorporates parallel tracks thereinto, thus simplifying installation of the system.

DETAILED DESCRIPTION OF THE DRAWINGS

Figure 1:
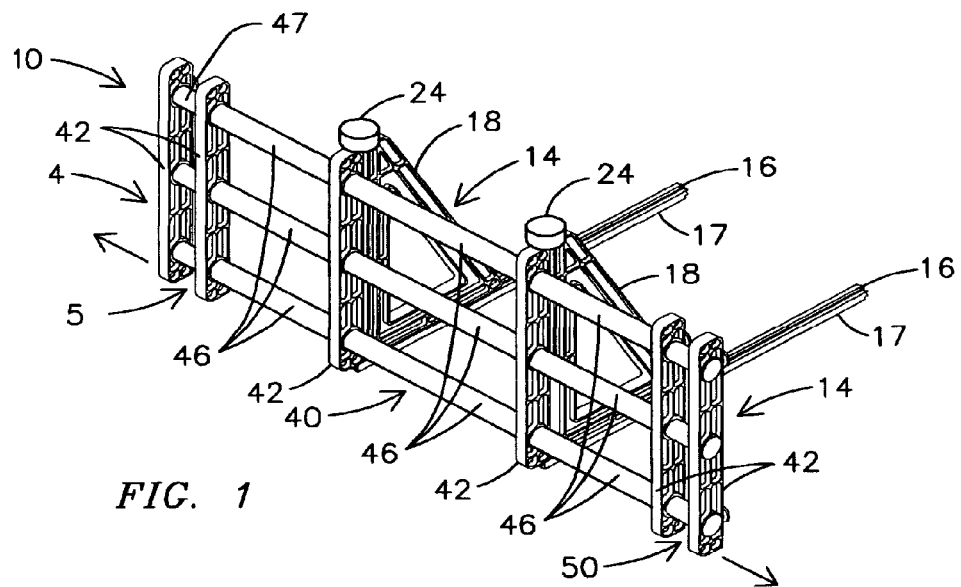
FIG. 1 is a perspective view of the improved cargo gate system with newly designed braces.

Referring to FIGS. 1 through 7, an improved adjustable cargo gate system 10 is designed to secure cargo from sliding around the bed 12 of a pickup truck, or falling over and rolling about, when the truck is accelerating, decelerating or turning. The gate member 14, which is more particularly described below, slides forward or aft on a pair of parallel tracks 16 spaced apart lengthwise and affixed to the truck bed 12, thereby permitting the system to adapt to varying sizes of loads to be secured. Tracks 16 are conventional; each defines a rectilinear C shape in cross-section, lying on its backside, as in FIG. 1. The vertical legs of the rectilinear C shape are bent toward one another, forming flanges 17. The tracks could be made of aluminum and are available from the Loxcreen Company, Inc., a South Carolina corporation. Alternatively they could be made of rigid plastic.

Figure 3:
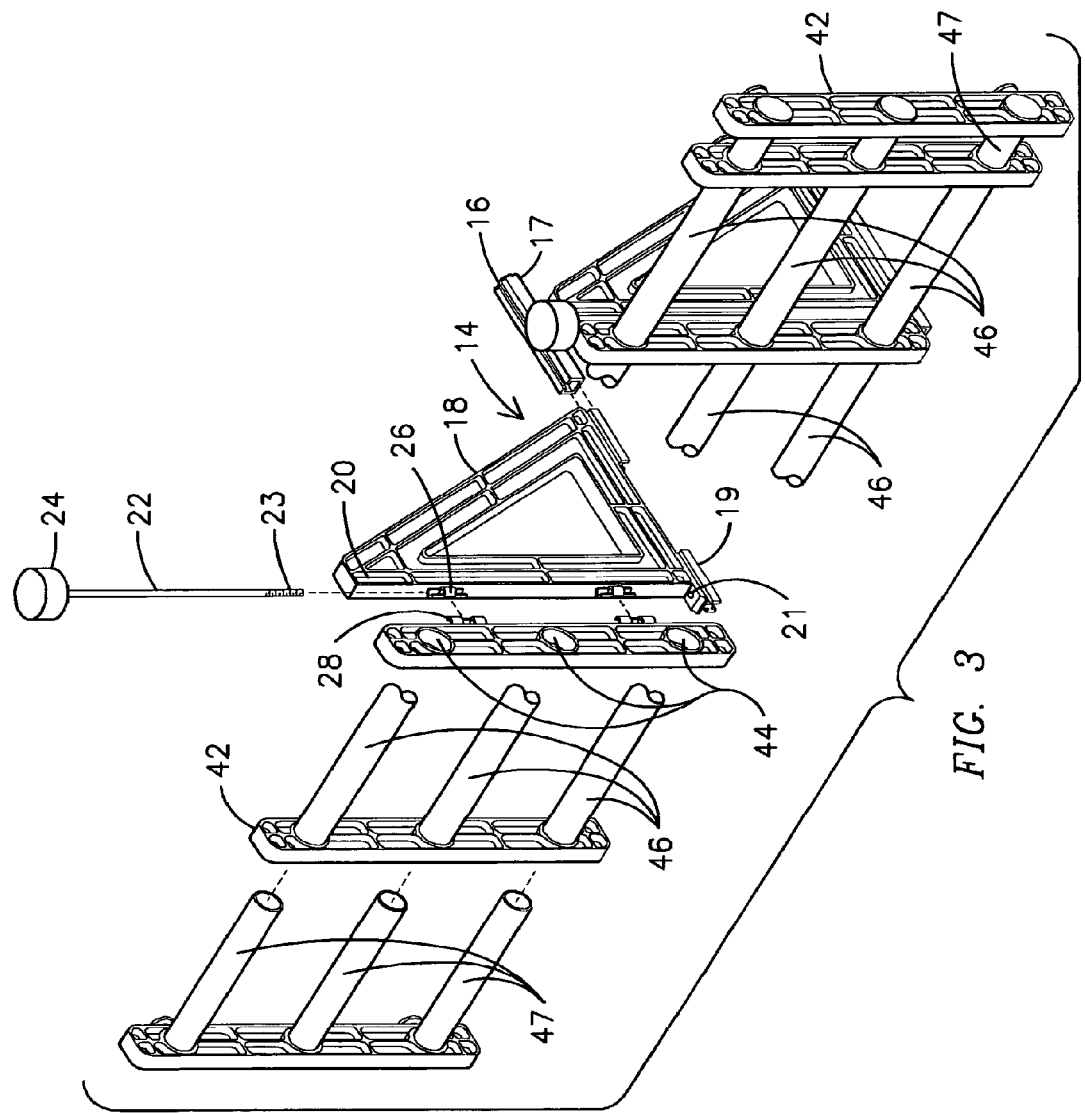
FIG. 3 is an exploded detailed view of FIG. 1.
Figure 4:
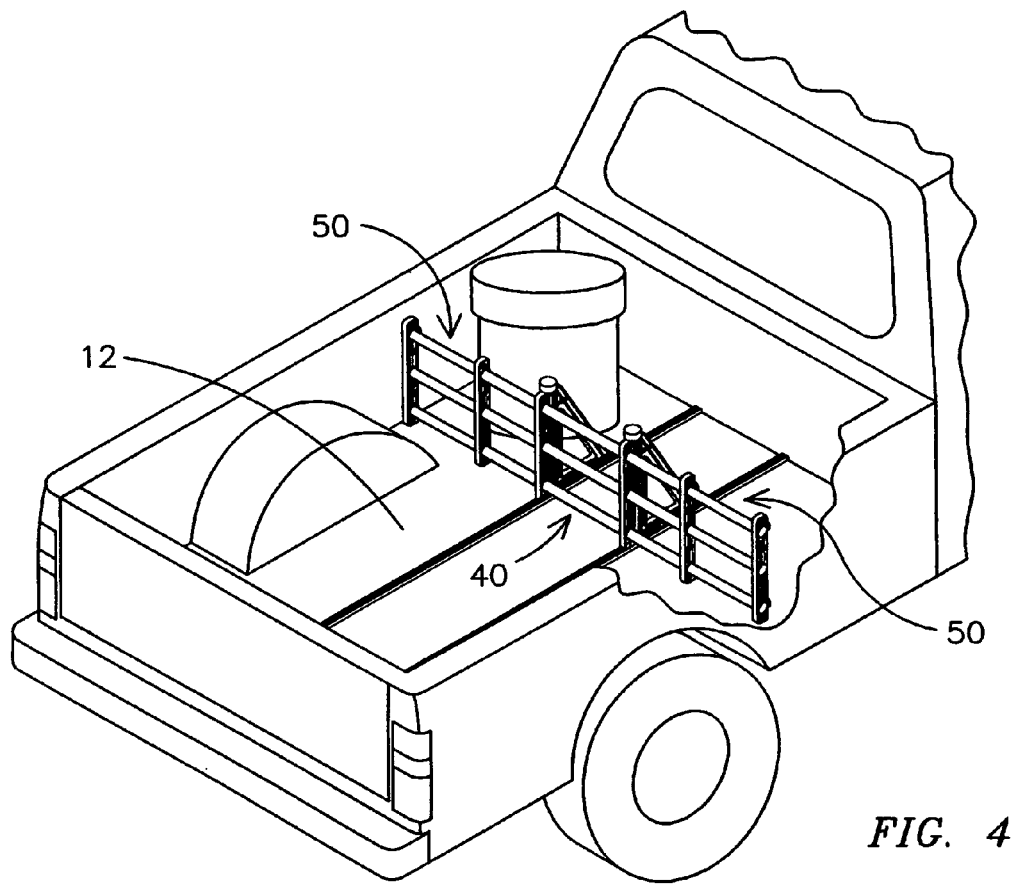
FIG. 4 is a perspective view of the improved system on a truck bed with tailgate closed.
Figure 8:
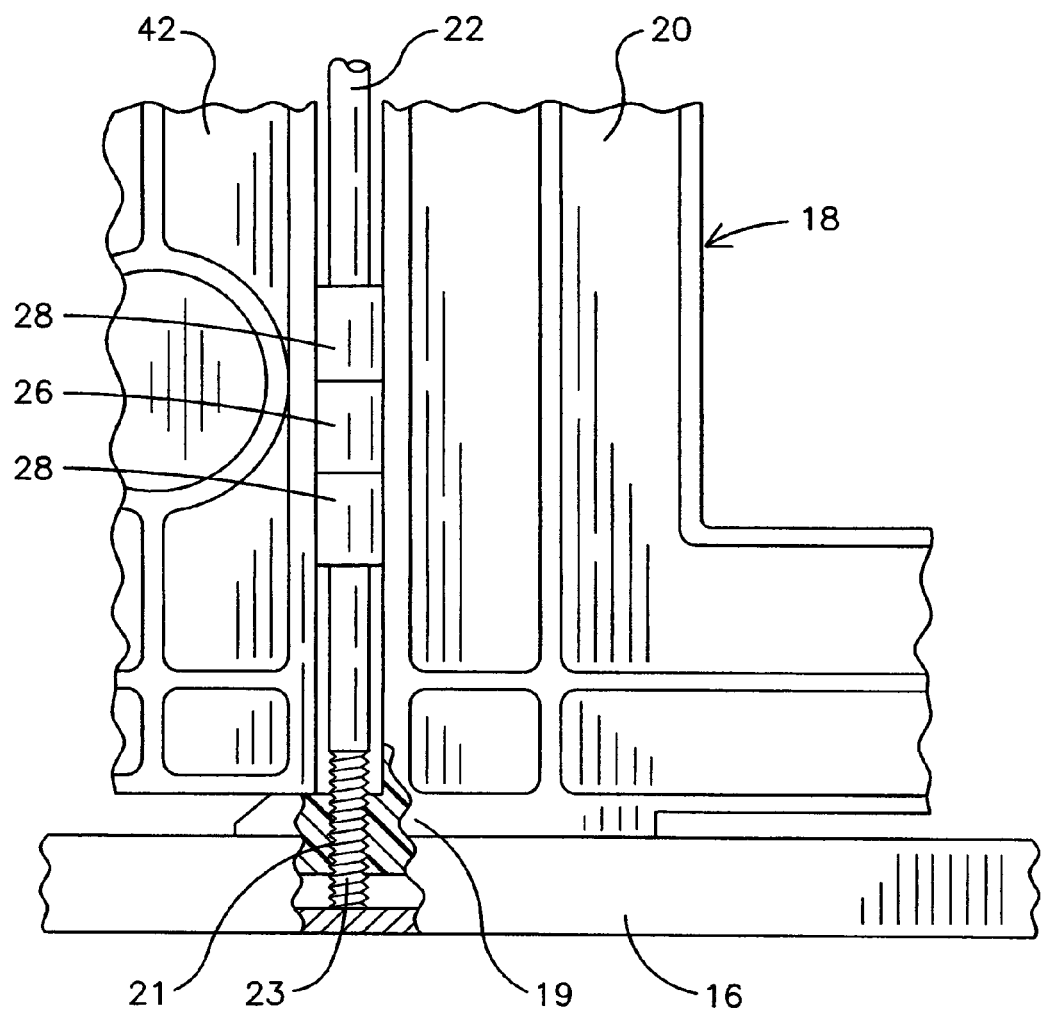
FIG. 8 is a detailed view of the means of locking the gate system in a desired location, with a longituditunal section of one of the tracks.

Gate member 14 is supported in an upright position by two braces 18, each defining a vertical right triangle. As shown in FIGS. 3 and 8, the base 19 of brace 18 is configured to slide in and mate with track 16. The vertical leg 20 of each brace 18 is removably fastened to each of two center vertical struts 42 by bolts 22 inserted through mating hinge parts 26 and 28 protruding from legs 20 and center struts 42, respectively. The bottom ends 23 of bolts 22 are threaded and mate with threaded holes 21 through base 19. Ends 23 may extend downward into tracks 16 so that braces 18 can be locked down at any location along tracks 16 by turning knobs 24 clockwise.

Referring now to FIGS. 1 and 3, 4 and 5 gate member 14 is essentially a grating in three sections: a center section 40, and two telescoping side sections 50 which are mirror images of each other. Center section 40 has optimally four vertical struts 42, having parallel horizontal bores 44 milled or molded through the sides thereof, through which horizontal tubular rails 46 are threaded. Side sections 50 each have one vertical strut 42. Optimally rails 46 are made of rigid aluminum tubing. Side sections 50 are removable and have rails 47 that telescope into rails 46, as shown in FIG. 3.

The assembled center section 40 and side sections 50 should be welded or glued at each junction of struts 42 and horizontal rails 46. Alternatively, rivets may be used at junctions where they will not protrude through the inner diameter of the tubing to interfere with telescoping engagement of side sections 50 with center section 40. In the preferred embodiment, the struts 42 and braces 18 are molded of rigid plastic, but could be made of other strong rigid material.

The telescoping feature of gate member 14 allows the width of it to be adjusted for different widths of truck beds, as well as the narrowing of a truck bed at the rear wheel wells. Gate member 14 is easily removed by loosening bolts 22 and sliding braces 18 rearward out of engagement with tracks 16. Braces 18 can then swing 90° and gate member 14 can be stored flat.

Figure 2:
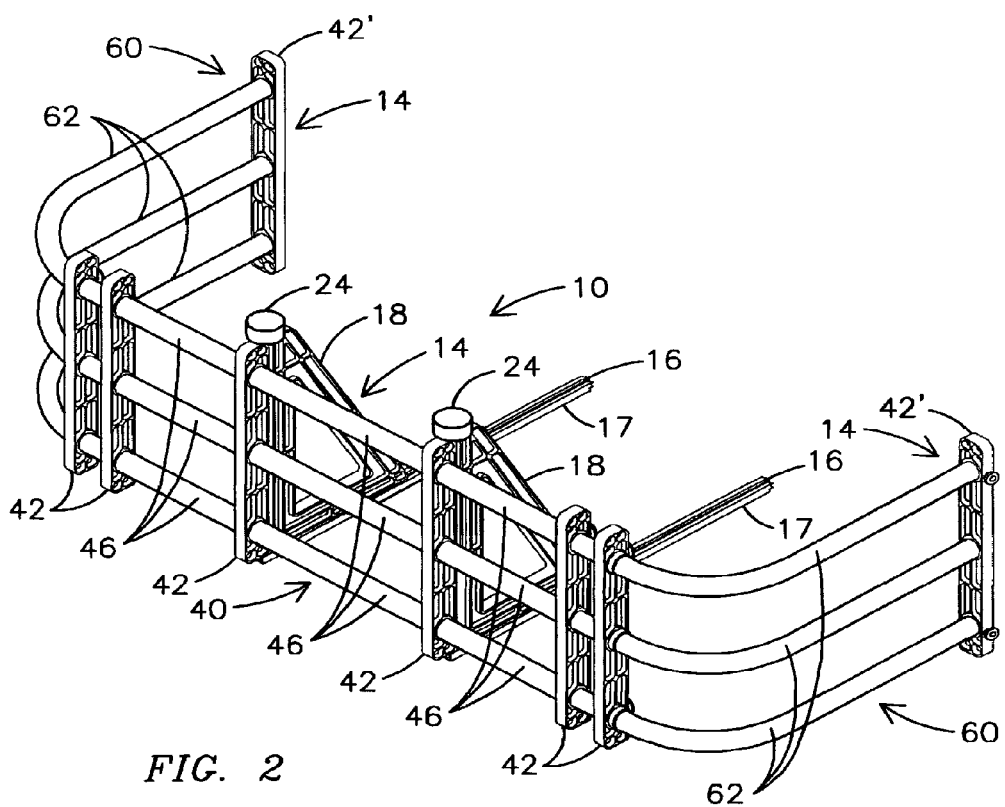
FIG. 2 is a perspective view of the invention with L-shaped extensions.
Figure 5:
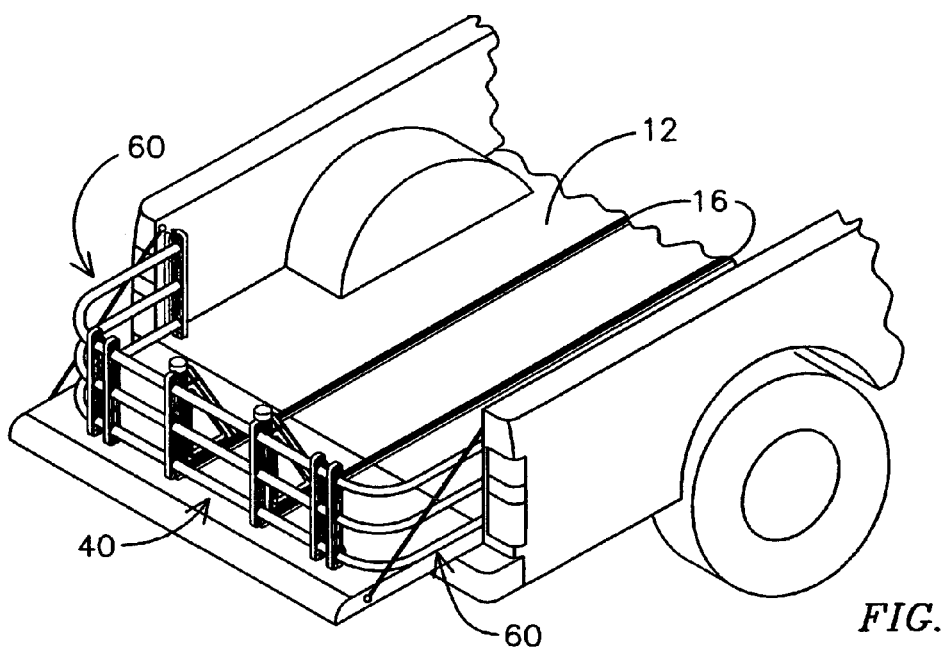
FIG. 5. is a perspective view of the invention with extensions on a truck bed with tailgate open.
Figure 6:
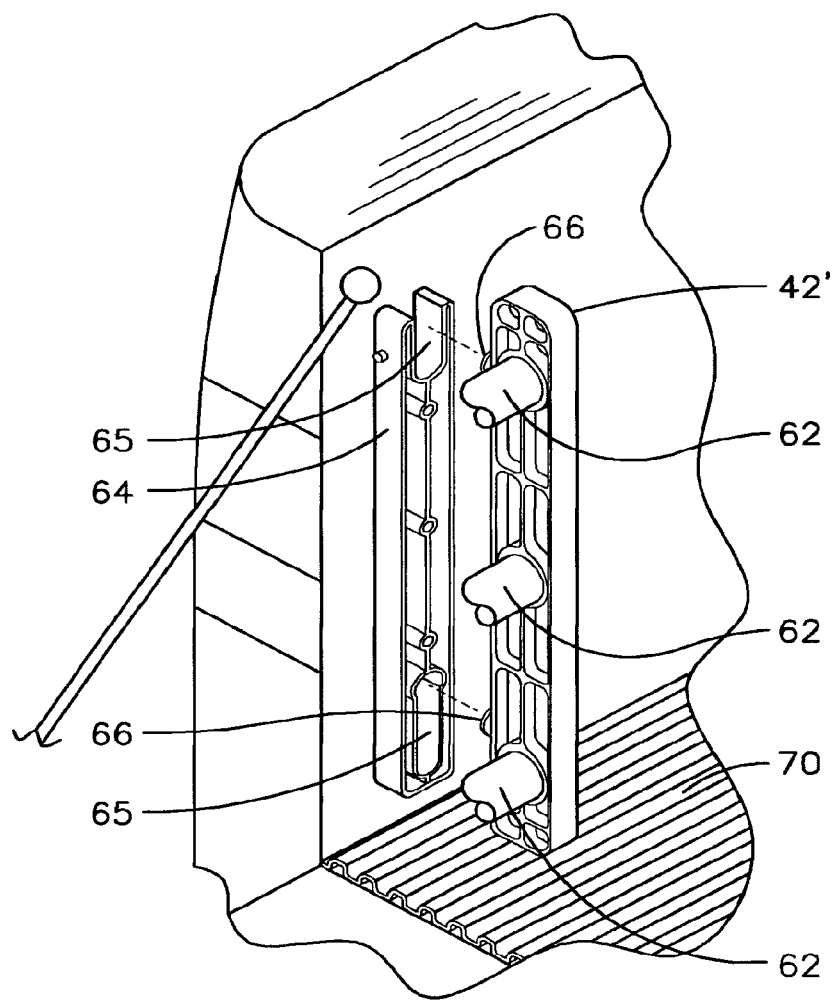
FIG. 6 is a detailed exploded view of the means of fastening the extensions to the side walls of a truck bed.

Referring now to FIGS. 2, 5 and 6, when it is desired to extend the truck bed and utilize the tailgate of a truck for transporting cargo, gate member 14 can be configured to enclose an opened tailgate. Side sections 50 are replaced with L-shaped or j-shaped sections 60, comprised of curved horizontal rails 62 threaded through vertical struts 42 proximal to center section 40 and terminating at struts 42'. Struts 42' are removably attached to brackets 64 mounted on the truck sidewalls close to the tailgate doorway, as shown in FIG. 6. Brackets 64 have slots 65 which can engage bolthead-like members 66 protruding from outside edges of struts 42'. Track extensions 68 mounted on the inside surface of the tailgate accept braces 18, allowing gate member 14 to slide to the outer edge of the tailgate when it is opened flat.

Figure 7:
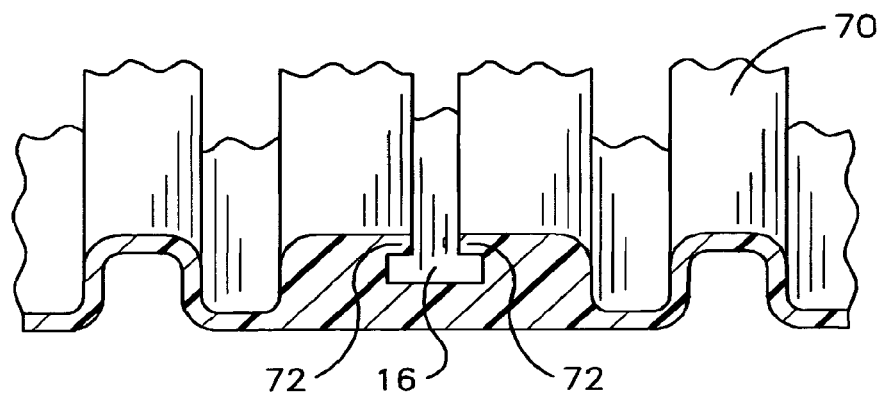
FIG. 7 is a cross-sectional view of a truck bed liner with a track incorporated into the liner.

An alternative to fastening tracks 16 to the bed of a truck is to incorporate tracks 72 into a bed liner 70, as shown in FIGS. 6 and 7, during the manufacturing or molding process thereof. Bedliner 70 should be formed of stiff plastic and/or fiberglass.

We claim:

1. In an adjustable cargo gate system for restraining cargo on an open bed of a vehicle, the open bed having longitudinally spaced apart forward and rearward ends, spaced apart sidewalls, and a tailgate having an inner surface, said tailgate disposed at the rearward end of the vehicle bed and opening to a horizontal position aligned with said vehicle bed, the system comprising track members removably secured to the vehicle bed and disposed parallel to said vehicle sidewalls; a removable gate member disposed perpendicular to said track members and to said vehicle sidewalls; the gate member comprised of a center section and telescoping end sections, each section being a latticework of horizontal rails and vertical struts; bracing means removably attachable to said latticework for supporting said gate member in an upright position, the bracing means having sliding means for positioning the gate member anywhere along the track members; and locking means for securing the bracing means at a selected position on said track members;

an improvement wherein:

said bracing means for supporting said gate member are one-piece members defining right triangles and having bases slidably engageable with said track members;

said gate member has alternative L-shaped end sections for enclosing said tailgate in its opened, horizontal position;

mounting means for removably securing said L-shaped end sections to the rearward ends of the sidewalls of the vehicle;

parallel spaced-apart track extension members disposed on said inner surface of said tailgate, said extension members having forward and stern ends, said forward ends of said extension members aligned with said track members on said vehicle bed, whereby said gate member may slide to a rear-most edge of said tailgate.

2. The improvement of claim 1 wherein each said alternative L-shaped end section is a latticework of horizontal rails and vertical struts, has a forward end and a rearward side, said forward end being securable to a rearward end of a sidewall of the vehicle and the rails of the rearward side removably slidable into the horizontal rails of the center section of the gate member.

3. The improvement of claim 1 wherein the track members are incorporated into a vehicle bed liner.

4. In an adjustable cargo gate system for restraining cargo on an open bed of a vehicle, the open bed having longitudinally spaced apart forward and rearward ends, spaced apart sidewalls, and a tailgate having an inner surface, said tailgate disposed at the rearward end of the vehicle bed, and opening to a horizontal position aligned with said vehicle bed; the system comprising:

track members having stern ends, said track members removably secured to the vehicle bed and disposed parallel to said vehicle sidewalls; a removable gate member disposed perpendicular to said track members and to said vehicle sidewalls; the gate member comprised of a center section and telescoping end sections, each section being a latticework of horizontal rails and vertical struts; bracing means removably attachable to said latticework for supporting said gate member in an upright position, the bracing means having sliding means for positioning the gate member anywhere along the track members; and locking means for securing the bracing means at a selected position on said track members;

an improvement wherein:

said bracing means for supporting said gate member are one-piece members defining right triangles and have bases slidably engageable with said track members;

said gate member has alternative L-shaped end sections for enclosing said tailgate in its opened, horizontal position, each said L-shaped end section comprising a latticework of horizontal rails and vertical struts, a forward end and a rearward side, said forward end of said end section being removably securable to a rearward end of a sidewall of the vehicle and the rails of the rearward side thereof removably slidable into the horizontal rails of the center section of the gate member;

parallel spaced-apart track extension members are disposed on said inner surface of said tailgate, said extension members having forward and stern ends, said extension members aligned with said track members on said vehicle bed, said forward ends of said extension members being adjacent said stern ends of said track members, whereby said gate member may slide to the rear-most edge of said tailgate; and the track members on said vehicle bed are incorporated into a vehicle bed liner.

* * * * *